US011061160B1

(12) United States Patent
Weber

(10) Patent No.: US 11,061,160 B1
(45) Date of Patent: Jul. 13, 2021

(54) SYSTEM AND METHODS OF MAPPING BURIED PIPES UNDERWATER

(71) Applicant: DOC MAPPING, L.L.C., New Orleans, LA (US)

(72) Inventor: Peter Weber, New Orleans, LA (US)

(73) Assignee: Doc Mapping, L.L.C., New Orleans, LA (US)

( * ) Notice: Subject to any disclaimer, the term of this patent is extended or adjusted under 35 U.S.C. 154(b) by 0 days.

(21) Appl. No.: 16/366,583

(22) Filed: Mar. 27, 2019

Related U.S. Application Data

(62) Division of application No. 15/217,481, filed on Jul. 22, 2016, now abandoned.

(60) Provisional application No. 62/196,755, filed on Jul. 24, 2015.

(51) Int. Cl.
| | | |
|---|---|---|
| *G01V 3/10* | (2006.01) | |
| *G01V 3/15* | (2006.01) | |
| *F16L 1/12* | (2006.01) | |

(52) U.S. Cl.
CPC ............... *G01V 3/104* (2013.01); *F16L 1/12* (2013.01); *G01V 3/15* (2013.01)

(58) Field of Classification Search
CPC ... G01V 3/00; G01V 3/02; G01V 3/04; G01V 3/06; G01V 3/08; G01V 3/081; G01V 3/082; G01V 3/083; G01V 3/084; G01V 3/085; G01V 3/087; G01V 3/088; G01V 3/10; G01V 3/101; G01V 3/102; G01V 3/104; G01V 3/105; G01V 3/107; G01V 3/108; G01V 3/15; G01V 3/165
See application file for complete search history.

(56) References Cited

U.S. PATENT DOCUMENTS

| | | |
|---|---|---|
| 3,514,693 A | 5/1970 | Cagniard |
| 3,946,696 A | 3/1976 | Lubnow |
| 4,047,098 A | 9/1977 | Duroux |
| 4,348,639 A | 9/1982 | Karbowski |
| 5,055,793 A | 10/1991 | Mulcahey |
| 5,444,374 A * | 8/1995 | Stanley .................... G01V 3/08 324/334 |
| 5,764,127 A | 6/1998 | Hore et al. |

(Continued)

FOREIGN PATENT DOCUMENTS

EP          1150314 A2     10/2001

*Primary Examiner* — David M Schindler
(74) *Attorney, Agent, or Firm* — Jones Walker LLP

(57) ABSTRACT

It may be difficult to determine the location of objects underwater, especially when they are buried below a seabed. A system for detecting conductive objects underwater may include a long conductive cable in electric communication with a signal generator. When the cable is positioned proximate to the conductive object, its signal may induce a current and a detectible secondary magnetic field in the conductive object. A sensor, preferably positioned distally from any portion of the conductive cable, may detect the secondary magnetic field and thereby determine the location of the conductive object. A method of detecting and mapping the location of a buried underwater pipeline comprising a conductive material may include: sending a predetermined current through a conductive cable attached to a first water vehicle; inducing an induced current in the pipeline; and detecting the location of at least a portion of the pipeline by a sensor attached to a second water vehicle.

14 Claims, 6 Drawing Sheets

(56) References Cited

U.S. PATENT DOCUMENTS

| | | | |
|---|---|---|---|
| 5,825,188 A | 10/1998 | Montomery et al. | |
| 6,236,212 B1* | 5/2001 | Wynn | G01V 3/06 |
| | | | 324/357 |
| 7,203,599 B1* | 4/2007 | Strack | G01V 3/083 |
| | | | 324/354 |
| 7,336,078 B1 | 2/2008 | Merewether et al. | |
| 7,733,077 B1 | 6/2010 | Merewether et al. | |
| 7,990,151 B2 | 8/2011 | Olsson et al. | |
| 8,013,610 B1 | 9/2011 | Merewether et al. | |
| 8,688,423 B2 | 4/2014 | Jessop et al. | |
| 2008/0122444 A1* | 5/2008 | Schaug-Pettersen | G01V 3/12 |
| | | | 324/335 |
| 2009/0309599 A1* | 12/2009 | Ziolkowski | G01V 3/083 |
| | | | 324/334 |
| 2010/0321024 A1* | 12/2010 | Nichols | G01V 3/083 |
| | | | 324/348 |
| 2011/0309836 A1* | 12/2011 | Bittar | G01V 3/26 |
| | | | 324/339 |
| 2012/0069702 A1* | 3/2012 | Muyzert | G01V 1/3843 |
| | | | 367/15 |
| 2013/0300420 A1* | 11/2013 | Juhasz | G01V 3/083 |
| | | | 324/365 |
| 2014/0191760 A1* | 7/2014 | Zinger | G01V 3/083 |
| | | | 324/334 |
| 2015/0301217 A1* | 10/2015 | Lindqvist | G01V 3/08 |
| | | | 324/365 |

* cited by examiner

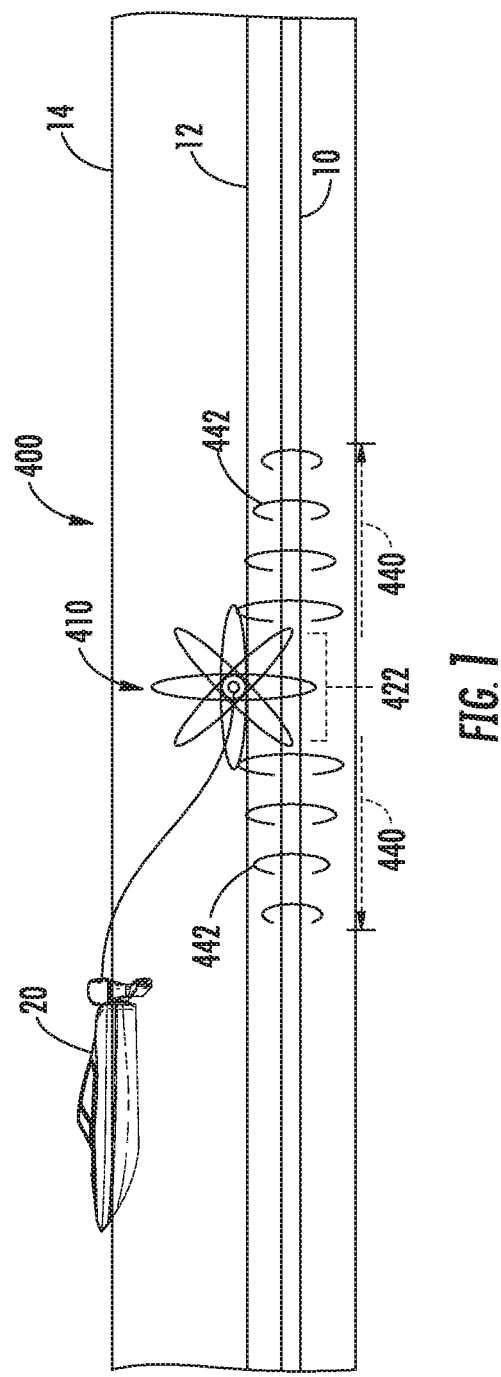

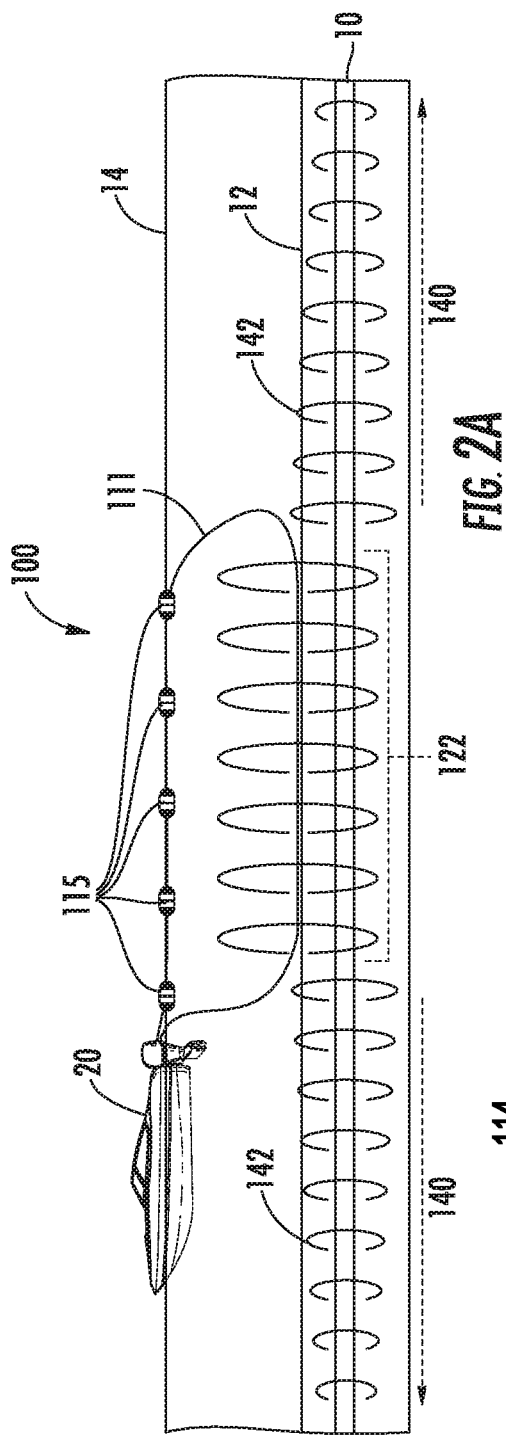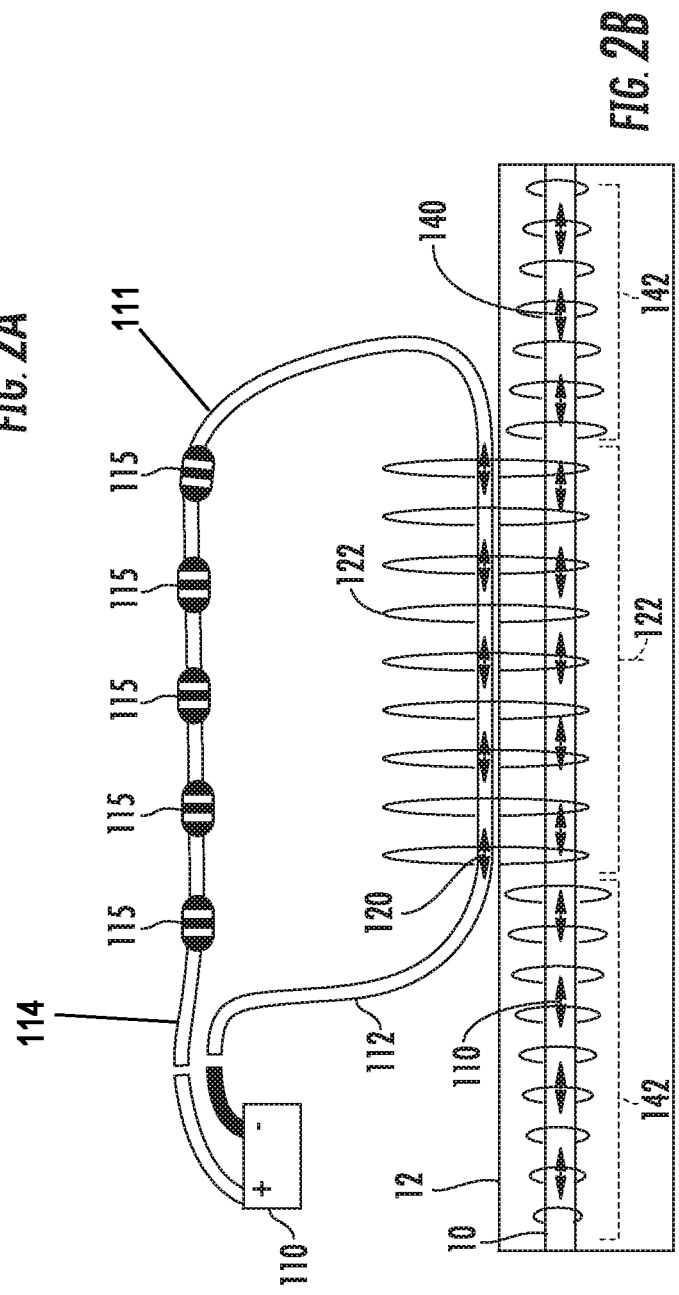

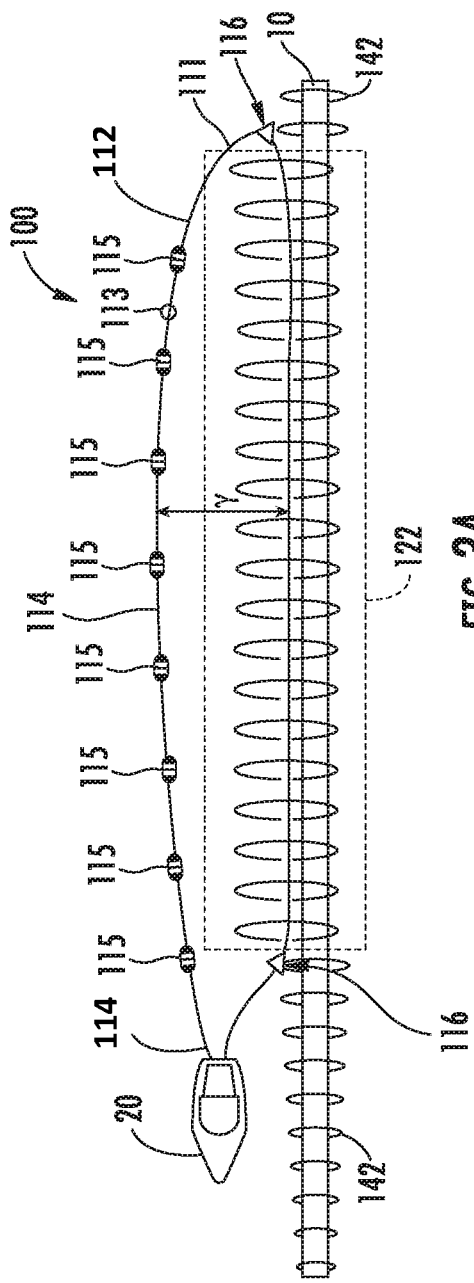
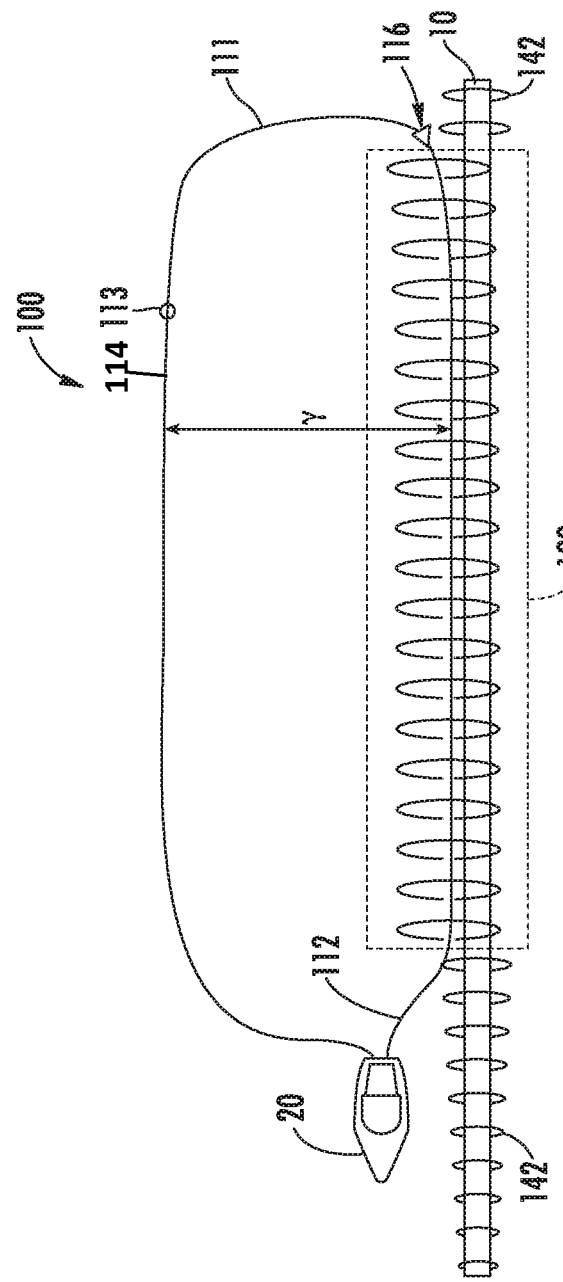

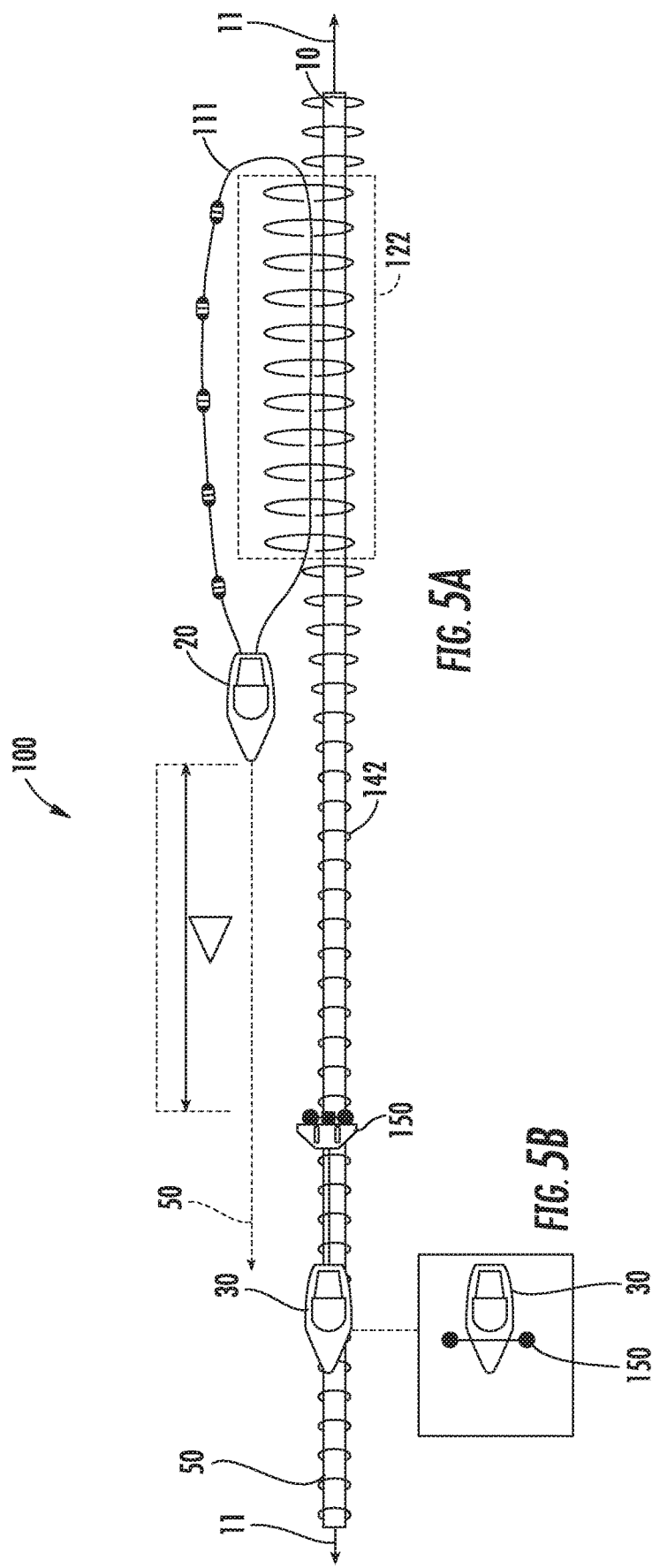

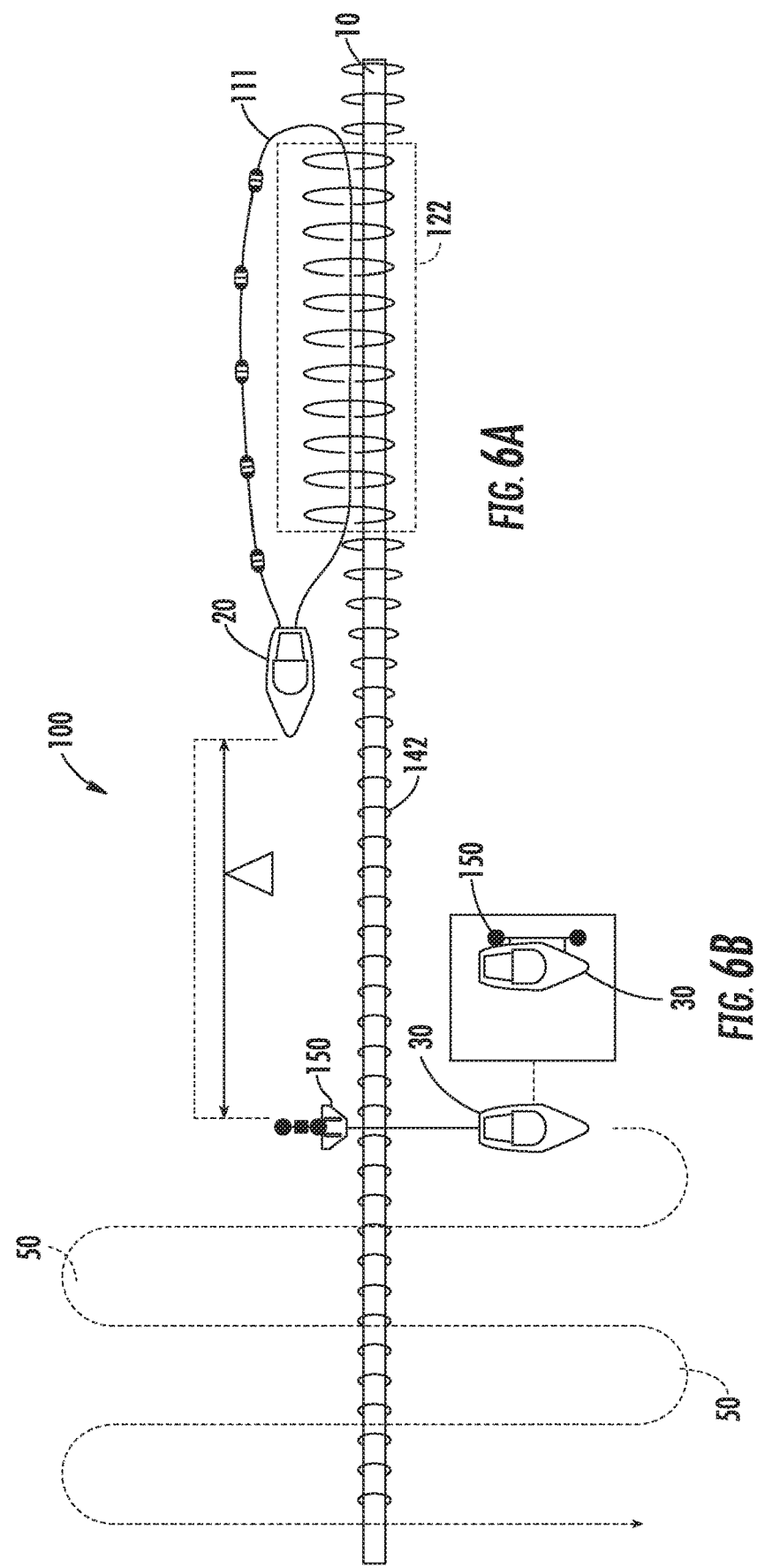

SYSTEM AND METHODS OF MAPPING BURIED PIPES UNDERWATER

CROSS-REFERENCE TO RELATED APPLICATIONS

This application is a division of application Ser. No. 15/217,481, filed Jul. 22, 2016, which application claims the benefit of U.S. provisional application No. 62/196,755, filed Jul. 24, 2015, both of which are incorporated by reference herein in their entirety.

BACKGROUND

Technical Field

This disclosure relates to apparatuses and processes for detecting the location of conductive objects. More specifically, but without limitation, described herein are systems and methods for locating and mapping buried pipes using long conductive cables towed by one or more water vehicles.

Relevant Art

The reference in this disclosure to any prior publication (or information derived from it) or to any matter which is known, is not, and should not be taken as, an acknowledgement or admission or any form of suggestion that the publication, information, or matter forms part of the common general knowledge in the field of endeavor to which this disclosure relates.

Techniques for locating buried pipes on land do not necessarily translate to detecting and mapping conductive objects underwater. For example, in one technique, signal transmitter leads are directly attached to a conductive pipeline and a transmitter applies an AC signal directly to the pipeline. For example, a survey on an offshore pipeline with partial onshore direct access may apply the direct connection technique using a signal having frequency between 33 Hz and 128 Hz to maximize signal propagation distance and minimize attenuation of the magnetic field for the portions of the pipeline that are underwater. But when the pipeline is buried and underwater, it becomes much more difficult to access the pipeline to directly attach the signal transmitter leads. Furthermore, available transmitters used for the direct attachment technique are generally not configured for inductive applications and may lack optimal power and frequency capabilities.

The following disclosures are incorporated by reference in their entirety: U.S. Pat. Nos. 3,514,693; 3,946,696; 4,047,098; 4,348,639; 5,764,127; 5,825,188; 7,336,078; 7,733,077; 7,990,151; 8,013,610; 8,688,423; 5,055,793; and EP1150314.

SUMMARY

A large loop induction system and method is well suited to detecting and mapping target conductive objects underwater, including pipelines buried underwater. Many of these systems and methods are also suitable for detecting and mapping target conductive objects on land.

Many large loop induction systems and methods described herein may be particularly suitable for pipelines that are long distances offshore, e.g., about 8 or more kilometers, and for which it may be impractical for a current to be directly applied to the pipeline (i.e., the direct attachment technique). They may also be suitable for mapping pipelines with limited or no physical access, e.g., in rivers and other bodies of water with high traffic.

In one embodiment, a system for detecting and mapping conductive objects underwater may comprise a long conductive cable in electric communication with a signal generator. When the cable is positioned proximate to the target conductive object, its signal may induce a current and a detectible secondary magnetic field in the conductive object. A sensor may detect the secondary magnetic field and thereby infer the location of the conductive object.

In another embodiment, a method of detecting and mapping the location of a buried underwater pipeline comprising a conductive material may include: sending a predetermined current through a conductive cable attached to a first water vehicle; inducing an induced current in the target pipeline; and detecting the location of at least a portion of the pipeline by a sensor attached to a second water vehicle.

Alternatively, an induction coil may be modified to operate underwater. See FIG. 1. But the induction coil technique is poorly suited for detecting conductive objects underwater, and some embodiments of the large loop induction system have significant advantages over a modified coil induction system.

First, as shown in FIG. 2A, a long cable loop creates a larger area over which the loop's primary magnetic field overlaps with the target conductor, resulting in more signal power being transferred to the target conductor in the form of an induced signal. The long cable applies signal to the target conductor over the entire portion of the induction leg of the loop that is substantially proximate to and parallel with the pipeline. By contrast, FIG. 1 shows a modified coil induction system may apply a magnetic field over a relatively small portion of the target conductor, resulting in a relatively limited induced signal propagation and secondary magnetic field relatively localized to the coil source.

Second, unlike a coil induction system modified to operate underwater, a large loop induction system may comprise a transmitter that does not require waterproofing. The transmitter of the long loop induction system is preferably housed on a water vehicle and connected to a long, insulated, waterproof conductive cable.

Third, it is easier to orient at least a portion of the induction leg in the correct position relative to the target conductive object to induce a secondary signal in the target. For example, a loop may be towed along a survey path substantially parallel to the target conductor to maintain the loop's orientation to that conductor. Continuous signal transfer may therefore be achieved over a long distance. The coil system can be much more difficult to keep in line with the target conductor and is prone to misalignment. Because the coil system creates a magnetic field in a relatively limited area, which is further limited if the angle of the coil's primary magnetic field is not properly oriented with respect to the target, it may be more difficult to correctly position the coil system with respect to the target conductor, especially when buried and/or underwater. Failure to properly orient the small coil (even if positioned proximately to the target) in an underwater environment can result in little or no signal transferred to the target.

Nonetheless, some systems and methods in accordance with the invention may not have any or all of the foregoing advantages.

In one embodiment, the system may comprise a signal generator connected to a conductive line. At least a portion of the conductive line may be attached to at least one buoyant member, such as a float, buoyant jacket, or other positively buoyant material. The system may further comprise a sensor, wherein the sensor detects a predetermined oscillating electromagnetic signal.

In another embodiment, the system may comprise a transmitter in electric communication with an insulated cable at least about 3 meters in length, more preferably 30 meters, and even more preferably at least 300 meters.

The above summary is not intended to describe each illustrated embodiment or every possible implementation. These and other features, aspects, and advantages of the invention will become better understood with regard to the accompanying drawings, description, and claims.

BRIEF DESCRIPTION OF THE DRAWINGS

The accompany figures, where like reference numerals refer to identical or functionally similar elements throughout the separate views, which are not true to scale, serve to illustrate exemplary embodiments, forms, and aspects of the invention and to explain principles and advantages thereof:

FIG. 1 is a side view of a modified coil induction system.

FIG. 2A is a side view of an embodiment described herein.

FIG. 2B is a schematic view of the embodiment shown in FIG. 2A.

FIG. 3A is a top view of an embodiment described herein.

FIG. 3B is a top view of an embodiment described herein.

FIG. 5A is a top view of an embodiment described herein.

FIG. 5B is a detail view of an alternate embodiment described herein.

FIG. 6A is a top view of an embodiment described herein.

FIG. 6B is a detail view of an alternate embodiment described herein.

DESCRIPTION

Figure 4:
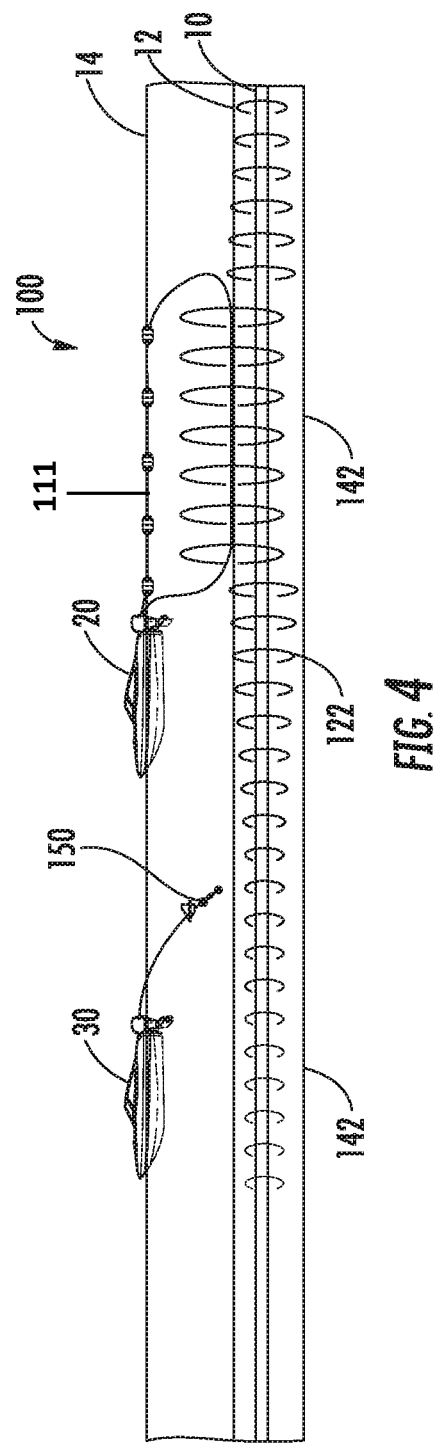
FIG. 4 is a side view of an embodiment described herein.

System and methods of detecting conductive objects underwater are described. In the interest of clarity, not all features of an actual implementation—e.g., dimensions, tolerances, etc.—are described in this disclosure. It will be appreciated that in the development of a product or method embodying the invention, the developer must make numerous implementation-specific decisions to achieve the developer's specific goals, such as compliance with manufacturing and business-related constraints, that will vary from one implementation to another. Moreover, it will be appreciated that such a development effort may be complex and time-consuming, but would nevertheless be a routine undertaking for those of ordinary skill in the art having the benefit of this disclosure.

A system embodying features of the present invention is shown in FIGS. 2A and 2B. A large loop induction system 100 may be attached to a watercraft 20 and used to detect and map the location of a target conductive object 10, such as a pipeline comprising conductive material. As shown in FIG. 2B, a large loop induction system 100 comprises a signal generator 110 in electric communication with a conductive cable 111.

In one preferred embodiment, a signal generator 110 (e.g., Loc-150TX Transmitter, Vivax-MetroTech, Santa Clara, Calif.; or Ridgid ST-33Q+ Transmitter, Ridge Tool Company, Elyria, Ohio) is in electric communication with a conductive cable 111. The signal generator 110 may send a primary signal 120 comprising alternating current at a predetermined power and frequency through the conductive cable 111. The primary signal 120 creates a primary magnetic field 122 about the conductive cable 111.

The conductive cable 111 may comprise two or more portions, including an induction leg 112 and a return leg 114. The conductive cable 111 may comprise any suitable conductive material, including copper, conductive metal alloy, or conductive polymer. The conductive cable 111 preferably has insulation that prevents water surrounding outer portions of the conductive cable 111 from contacting the conductive material.

Optionally, an induction leg 112 may comprise a conductive line with a lower gauge number (and therefore larger diameter) than a conductive line of the return leg 114. For example, an induction leg 112 may comprise a 16/3 SO cable, which comprises three 16 gauge insulated wires, and the return leg 114 may comprise 18 or higher gauge wire. Alternatively, the induction leg 112 may comprise a smaller or larger gauge than 16 gauge and the return leg 114 may comprise the a conductive line with a gauge equal to or greater than the induction leg 112.

Optionally, the conductive cable 111 may comprise one or more conductive lines having one or more windings. For example, a conductive cable 111 may comprise three conductive lines, A, B, and C, each running at least a portion of the length of cable 111. In a configuration with two windings, the conductive lines may wind back on themselves twice as follows: one end of line A may be connected to a signal generator 110, the other end of line A may be connected to an end of line B, the other end of line B may be connected to an end of line C, and the other end of line C may be connected to the signal generator 110. In other words, in this configuration the current may flow through the cable 111 as follows: from the signal generator 110 through line A, then through line B, then line C, and then back to the signal generator 110 to close the circuit. Connections between lines A-B and B-C may be proximate to or on water vehicle 20, such that the signal 120 may travel most of the distance along conductive cable 111 three times between leaving and returning to a signal generator 110 (rather than merely once in the case of no windings). Alternative embodiments of conductive cable 111 may have one, two, three, four, five, or more windings.

As shown in FIGS. 2A, 3A, and 4, in some embodiments, at least the return leg 114 may have positive buoyancy in water. Optionally, one or more floats 115 may be attached to the return leg 114. In addition or alternatively, the return leg 114 may comprise buoyant materials, such as foam. Although a portion of the return leg 114 may be offset from the induction leg 112, as suggested by the top view of FIG. 3A, most of the length of return leg 114 is preferably directly above the induction leg 112 (as suggested by the view of FIG. 4).

Alternatively, FIG. 3B is meant to suggest that the return leg 114 may have neutral or negative buoyancy and at least a portion of the return leg 114 may rest on the bed 12 of the water body.

Optionally, as shown in FIG. 3A, a buoyant member may be attached to a distal end of the induction leg 112. For example, the induction leg 112 may comprise one or more floats 112, preferably proximate to connector 113 and/or a water vehicle 20.

As shown in FIG. 4, in some embodiments, a large loop induction system 100 may include a watercraft 20 or other water vehicle. A sensor 150 may be attached to a second watercraft 30. Alternatives to the small watercraft shown in the figures include large ships, barges, remotely operated vehicles, drones, floating platforms, and other water vehicles.

A target conductive object 10 may be a pipeline comprising conductive material. Other target conductive objects include electrical cables, fiber optic cables with tracer wires, plastic or concrete pipes with tracer wires, and other linear objects comprising conductive material.

As best seen in FIGS. 2B and 4, in some embodiments, the large loop induction system 100 may induce a detectible secondary magnetic field 142 for locating the target conductive object 10. A magnetic field sensor 150 (e.g., Field-Sens and/or Spar 300, Optimal Ranging, Inc., Santa Clara, Calif.; Ridgid SeekTech SR-20, Ridge Tool Company, Elyria, Ohio) may be used to detect the secondary magnetic field 142. The sensor 150 may be any suitable magnetic field detection device, including scanners and locators.

A sensor array may comprise a sensor 150 and/or sonar and/or a positioning device (not shown), including Global Navigation Satellite System receiver utilizing the Global Positioning System (GPS), the Global Navigation Satellite System (GLONASS), other global and regional positioning systems, or other positioning device. Sonar may be used to track the water depth. The positioning device may track the location of the watercraft 30 and/or sensor 150. Using sensor 150 and/or a sensor array, the approximate location of the target conductive object 10 may be inferred from data collected by the sensor 150, including the vector direction, magnitude, phase, and frequency of the secondary magnetic field, and the data collected from the positioning device and/or sonar, if any.

As shown in FIGS. 5A, 5B, 6A, and 6B, in some embodiments, a sensor 150 may be attached to a second watercraft 30. The term "attached" is broad and includes the sensor 150 towed behind (see FIGS. 5A and 5B), mounted on (see FIGS. 5B and 6B), positioned on, or connected to a watercraft 30 or other water vehicle. Alternatively, the sensor 150 and the conductive cable 111 may be attached to the same water vehicle if means are provided to sufficiently separate them and prevent interference.

As shown in FIGS. 5A and 6A, when watercraft 20, 30 are employed, one or both may follow a survey path 50. The survey path 50 may be developed from preexisting mapping data, such an old pipeline map or construction plans, and/or inferred from continuously monitoring detection data from the system. By continuously monitoring detection data, the survey path 50 may then be adjusted as needed.

For example, in one embodiment shown in FIG. 5A, both the mapping boat 30 and the induction boat 20 may follow a substantially linear survey path 50 at up to about 4 knots, but preferably about 2 knots. The survey path 50 may be substantially parallel to a longitudinal axis 11 of the pipeline 10. While following a substantially linear path, the boats 20, 30 may nonetheless make corrective movements over the target 10 to enhance the induction or detection of magnetic field 142.

Alternatively, as shown in FIG. 6A, the induction boat 20 may follow a substantially linear path at about 2 knots and the mapping boat 30 may follow a serpentine path 50 above the target conductive object 10.

Alternatively, the mapping boat 30 may follow a substantially linear path and the induction boat 20 may follow a serpentine path.

Alternatively, both the mapping boat 30 and the induction boat 20 may follow a serpentine path.

A serpentine survey path may be used when detection data for the secondary magnetic field 142 becomes unavailable or is discontinuous. For example, a serpentine path may be used to find or re-locate the target conductive object 10 whereupon a linear and/or serpentine path may be employed to continue to detect and map portions of the conductive object 10.

In preferred embodiments, the magnetic field sensor 150 is positioned close enough to the target conductor 10 to detect the secondary magnetic field 142 and far enough from the conductive cable 111 to reduce interference from the primary magnetic field 122. But the distance Δ between the sensor 150 and the first watercraft 20 (or between the sensor 150 and conductive cable 111) is preferably not so great that the secondary magnetic field 142 becomes so attenuated that it is no longer detectible.

In some embodiments, the mapping water vehicle 30 may trail behind and follows the mapping water vehicle 20.

Without limiting this disclosure to any one theory, as shown in FIG. 2A, it is believed that the large loop induction system 100 induces an induced signal 140 in the target conductor 10 in accordance with Faraday's law and Lenz's law. The secondary magnetic field 142 will therefore have a vector that counters the direction of the magnetic flux of the primary magnetic field 122 that is incident to, and that induces the induced signal 140 in, the target conductive object 10. Accordingly, when alternating current is used for the primary signal 120 using a predetermined frequency, the induced signal 140 and secondary magnetic field 142 should have approximately the same frequency (after accounting for any phase shifting and other circuit phenomena, including resistance, inductance, capacitance, or time delay).

In operation, energy may move through the large loop system 100 and target conductive object 10 as follows. In one embodiment, a signal generator 110 sends a primary signal 120 of alternating current having a predetermined power and frequency through the induction leg 112 of the conductive cable 111. When the system 100 is in operation and locating and mapping a target conductor 10, the signal generator 110 preferably continuously sends primary the signal 120 through conductive cable 111 during such operations. The primary signal 120 has a primary magnetic field 122, which is incident to, and in turn induces an induced signal 140 with a corresponding frequency in, the target conductive object 10. The induced signal 140 propagates through the target conductive object 10 and has a detectible secondary magnetic field 142, which has a frequency corresponding to the predetermined frequency. Finally, a sensor 150 may detect the secondary magnetic field 142 and infer the location of the target conductive object 10. The sensor 150 may use the predetermined frequency to reduce noise and better detect the secondary magnetic field 142.

There are at least two sources of self-interference in the large loop induction system 100 that are preferably minimized. First, as a system 100 is deployed, a portion of the return leg 114 may have a current traveling in the opposite direction as the induction leg 112, and therefore the magnetic field (not shown) generated about that portion of the return leg 114 may partially reduce or cancel the magnetic field 122 of the induction leg 112. As shown in FIGS. 3A and 3B, the return leg 114 is preferably positioned at least a sufficient distance γ from the target conductor 10 that its magnetic field is attenuated relative to the primary magnetic field 112 proximate to the target 10. The distance γ is preferably at least twice the distance separating the induction leg 112 from the target conductive object 10. For example, if the induction leg 112 is about 3 meters from a target pipeline 10, then a distance γ between partially parallel portions of the induction leg 112 and the return leg 114 is preferably at least about 6 meters.

A suitable distance γ between the induction leg 112 and the return leg 114 may be achieved and maintained in several ways. In one embodiment, as shown in FIGS. 3A and 4, the return leg 114 may comprise buoyant members that float above most of the substantially parallel portions of the induction leg 112. The lateral separation of the induction leg 112 and the return line 114 is exaggerated in FIG. 3A, and the distance γ is primarily in the vertical direction.

In addition or alternatively, as suggested by FIG. 3B, the conductive cable 111 may be positioned on the bed 12 of the water body and the induction leg 112 and return leg 114 may be separated by a lateral distance γ. One method of deploying the conductive cable 111 in the configuration shown in FIG. 3B is as follows. A buoyant member (not shown) may be attached proximate to an end of the induction leg 112. A boat 20 may deploy one end of the induction leg 112 with the buoyant member substantially directly above the conductive target 10. At least a portion of the induction leg 112 may be deployed substantially parallel and proximate to a target conductive object 10. An anchor 116 may be attached to the induction leg 112 to add negative buoyancy. The boat 20 may deploy additional lengths of the conductive cable 111 (which may comprise either the induction leg 112 or the return leg 114 or portions of both) while traveling away from the conductive object 10 to achieve a suitable distance γ. The boat 20 may then turn and travel parallel to at least a portion of the induction leg 112 and deploy the return leg 114. Then the boat 20, continuing to deploy the return leg 114, may travel back to recover the floating end of the induction leg 112.

Second, when the sensor 150 is attempting to detect the secondary magnetic field 142, the induction cable 111 and mapping sensors 150 are preferably separated by a distance Δ that minimizes the risk that the magnetic field 122 generated by the loop 112 will cause interference in the mapping sensor 150. This distance Δ may be between 15 to 100 meters, or more preferably 30 to 70 meters, but can be more or less based on work conditions and system configuration. With the benefit of this disclosure, one of ordinary skill in the art could determine the optimal range through routine trial and error under actual operating conductions. For example, at the beginning of a survey, tests may be run with a mapping boat 30 at different distances Δ from the induction boat 20 to determine what the minimum gap A should be.

The frequency of the primary signal 120 may affect the magnitude and propagation of the induced signal 140, especially in underwater environments. As a general rule, higher frequencies may be more efficient at inducing an induced signal 140 than lower frequencies, but such induced signals 140 may not propagate as far along the target line 10, resulting in a relatively smaller secondary detectible magnetic field area 142. In other words, a higher frequency primary signal 120 has more magnetic flux and is more efficient at inducing an induced signal 140, but their magnetic fields 122, 142 are more attenuated in the gap between the induction leg 112 and the target 10 and as the signal 140 propagates down the target line 10. Lower frequencies, by contrast, tend to generate magnetic fields 122 that are more resistant to attenuation in water and permit induced signals 140 that propagate down the target line 10 at greater distances. But a lower frequency primary signal 120 generates less magnetic flux and is therefore less efficient at inducing the induced signal 140.

Using a signal generator 110 set to about 150 watts (36 volts, 4 amperes), a long loop induction system 100 may induce a signal 140 in a target pipe 10 at a perpendicular distance of about 2-4 meters from the target 10 with a predetermined frequency for the primary signal 120 of about 90 Hz to about 1300 Hz, (or any subrange between, including about 500 Hz to about 800 Hz) or more preferably about 640 Hz, to balance induction efficiency and signal propagation distance through the target pipe 10.

Routine trial and error may help determine a suitable power and frequency for the primary signal 120 and suitable ranges for distances Δ, γ. These and other aspects of the system 100 may be determined based on many factors, including whether a target conductive object 10 is buried or is above ground 12, the topography of the bed 12 of the water body, local noise (e.g., 60 Hz is a common frequency band), the nature and conductivity of a target conductive object 10, the orientation of the induction leg 112 and its distance from the target conductor 10, the magnetic field permeability of matter between the induction leg 112 and the target conductive object 10, weather conditions, water conditions, and other factors that one of ordinary skill in the art would appreciate with the benefit of this disclosure.

Deployment and recovery of the induction leg 112 and return leg 114 may be difficult if the cables are not handled with care, and tangles, conductor breaks, prop fouling, and damage to cable 111 may occur.

In some embodiments, the induction leg 112 may be a heavy jacketed negatively buoyant cable between about 30 meters and 300 (or any subrange between) or more meters long. If additional negative buoyancy is needed, for example to compensate for currents or tides, small drag anchors 116 may be attached to an end of the induction leg 112 proximate to the boat 20 and/or to the trailing end of the induction leg 112. Optionally, the trailing end of the induction leg 112 may be attached to a float 115 on the trailing side of the most distal drag anchor 116. The float 115 may provide a place for the induction leg 112 to attach to the return leg 114. The connection between induction and return legs 112, 114 may be a wet pluggable connector 113 that allows separation of legs 112, 114 for deployment and recovery, if needed. The return leg 114 may comprise a cable 114 that has positive buoyancy that runs from the most distal float 115 back to the boat 20. Positive buoyancy for the return leg 114 may be achieved by using small floats 115 at regular intervals along the return leg 114 and/or by using a positively buoyant jacket (not shown) and/or foam and/or other buoyant means.

Both the induction leg 112 and return leg 114 may be terminated on the ends proximate to the boat 20 at either a winch, reel, or other suitable container. For example, the induction leg 112 may be deployed and recovered via a powered winch with a slip ring for signal transfer. The return leg 114 may be deployed and recovered into a half barrel by hand (due to floats 115). Attachment points to legs 112, 114, including anchors 116, floats 115, and boat end terminations (not shown), preferably utilize strain relief mechanisms (e.g., Kellems Grip) to prevent damage to the cable 111.

For system 100 embodiments that comprise more than one water vehicle, coordinating and tracking the orientation of boats 20, 30 may enhance the efficiency of the survey and system 100. A minimum gap A between the sensor 150 and the induction boat 20 is preferably maintained. The induction boat 20 preferably remains in close proximity directly above the target line 10 to allow induction leg 112 to induce the maximum amount of signal 140. Determining and maintaining the minimum gap A may be achieved by a variety of means including radar, positioning devices, visual reference, laser range finder, or other suitable means, including boat to boat communications. The induction boat 20 preferably remains substantially directly above and aligned with the target line 10. The boats 20, 30 may following a path 50 on a chart plotter that is determined prior to deployment. The path 50 may be generated using as-built drawings of the target pipe 10, previous survey data and/or from points collected from a magnetometer survey. The induction boat 20 may follow the mapping boat 30 to insure that the induction cable 111 is in position relative to the target pipe 10.

Optionally, as shown in FIG. 6A, the mapping boat 30 may detect the secondary field 142 by meandering back and forth along a serpentine path 50 across the target line 10. If the signal 142 is lost by the mapping boat 30 using sensor 150, the induction boat 20 may move laterally until the signal 142 is regained. In addition or alternatively, the induction boat 20 may follow a serpentine path 50.

EXAMPLES

Large line induction systems and methods may be well suited to detect and map target conductive objects underwater, including pipelines buried underwater. Many of these systems and methods are also suitable for detecting and mapping buried pipelines above water.

Prophetic Example 1

A target pipeline 10 may be buried approximately 1-3 meters. The induction leg 112 may be about 100 meters, with approximately 40 meters thereof approximately above and substantially parallel to the target pipeline 10 at a distance of about 1 meter directly above pipeline 10, and the return leg may be about 40 meters. The parallel portions of the induction leg 112 and the return leg 114 are preferably a distance γ of at least about twice the distance between the induction leg and the target pipeline 10. The signal generator 110 may be set to about 4 amperes, about 36 volts, and about 640 Hz frequency. The induced signal 140 may propagate through the target pipeline 10 over 300 meters in each direction from the induction area 122. The sensor 150 is preferably positioned a distance Δ of at least about 40 meters from the signal generator 110 and the conductive cable 111.

In this embodiment, the primary signal 120 (i.e., the signal traveling through the portion of the induction leg 112 running approximately parallel to the target pipeline 10) induces a signal 140 onto the pipe 10 over a large area 142. Sufficient signal power is thereby induced to propagate the signal 140 far enough down the pipe 10 (e.g., as shown in FIG. 5A, at least the distance Δ separating the mapping boat 20 from sensor 150) to detect the secondary magnetic field 142 with detection and mapping sensors 150 while also avoiding interference from the signal generator 110 and conductive cable 111.

Prophetic Example 2

Turning to FIGS. 3A and 3B, the system 100 may comprise a signal generator 110 capable of generating an AC signal 120 appropriate for underwater induction. A length of insulted cable 111 preferably has a total length at least 3 meters and generally up to 300 meters or more. The cable 111 may have one or more individual conductive lines, which may be separately insulated. The system 100 may deploy about half of the cable 111, i.e., the induction leg 112, on or near the seabed 12 substantially above or near, and substantially parallel to, the target utility 10. In one embodiment, the induction leg 112 may comprise three or more 16 gauge conductive lines. The other half of the cable 111, i.e., the return leg 114, by be looped laterally (see FIG. 3B) or float above the induction leg 112 (see FIGS. 3A and 4). The return leg 114 may comprise 18 gauge conductive lines.

In a first form of this example, the inductive leg 112 of the insulated cable 111 may be laid on a seabed 12 proximate and substantially parallel to the target conductor 10 by using a boat 20 or other water vehicle to drive along the target conductor 10 and continuously spooling the inductive leg 112 of the cable 111 off of a drum (not shown). Then the return leg 114 of the cable 111 may be deployed to the side of the inductive leg 112 (on the seabed). Then the proximal ends of the induction leg 112 and the return leg 114 may be attached to the leads of a signal generator 110 and the transmitter 100 is powered up and set to a suitable amperage and frequency. Then the primary signal 120 travels through the cable 111 generating an oscillating magnetic field 122 that induces a secondary signal 140 onto the substantially parallel target conductor 10. The cable 111 may be towed along the target conductor 10 followed by the electronic mapping sensors 150, preferably about a separate vessel 30 or other water vehicle.

In a second form, the return leg 114 of the cable 111 may be deployed to float above the inductive leg 112 at the surface 14.

In a third form, a cable 111 may be left stationary and locating work using sensor 150 may take place along the target conductor 10 on either side of the induction leg 112.

Prophetic Example 3

As shown in FIG. 3A, to deploy some embodiments of the system 100 comprising floats 115, the distal end of the induction leg 112, attached to a first float 115, may be connected to the distal end of the return leg 114, which may be attached to a second float 115. The floats 115 may be deployed off the back of a boat 20 or other water vehicle. The boat 20 may slowly travel forward (about 1-2 knots) while the induction leg 112 is spooled off a winch. The return leg 114 may be paid out by hand or from a winch at the same speed as the induction leg 112. This may continue until the cable 111 is fully deployed. Once the system 100 is deployed, the boat 20 may slowly move down the target line 10 following the mapping boat 30. In addition or alternatively, and in some embodiments, a mapping boat 30 may follow the induction boat 20.

Prophetic Example 4

To deploy some embodiments of the system 100 in which the return leg 114 has neutral or negative buoyancy, both distal ends of legs 112, 114 may be attached to one or more anchors 116 and deployed as provided in Example 3. This arrangement may be preferred where the target survey area is relatively small, e.g., surveying a pipeline that is less than about 300 meters long, a water body is too shallow to effectively use floats 115, or the induction cable 111 does not need to be moved. The signal generator 110 may be housed on a boat, other water vehicle, or float.

The embodiments and examples shown in the drawings and described above are exemplary of numerous others that may be made within the scope of the appended claims. It is contemplated that numerous other configurations may be used, and each model of each component may be selected from numerous others than those specifically disclosed.

No special definition of a term or phrase, i.e., a definition that is different from the ordinary and customary meaning as understood by those skilled in the art, is intended to be implied by consistent usage of the term or phrase herein. The words and phrases used herein should be understood and interpreted to have a meaning consistent with the understanding of those words and phrases by those skilled in the relevant art. For example, an embodiment comprising a singular element does not disclaim plural embodiments; i.e., the indefinite articles "a" and "an" carry either a singular or plural meaning and a later reference to the same element reflects the same potential plurality. A structural element that is embodied by a single component or unitary structure may be composed of multiple components. Ordinal designations (first, second, third, etc.) merely serve as a shorthand reference for different components and do not denote any sequential, spatial, or positional relationship between them. As used in this disclosure, the terms "about" and "approximately" apply to all numeric values, whether or not explicitly indicated. These terms generally refer to a range of numbers that one of skill in the art would consider equivalent to the recited values (i.e., having the same function or result). Words of approximation such as "about," "approximately," or "substantially" refer to a condition or measurement that, when so modified, is understood to not necessarily be absolute or perfect but would be considered close enough by those of ordinary skill in the art to warrant designating the condition as being present or the measurement being satisfied. For example, a numerical value or measurement that is modified by a word of approximation, such as "about" or "approximately," may vary from the stated value by 1, 2, 3, 4, 5, 6, 7, 10, 12, and up to 15%.

The foregoing description of the embodiments of the invention has been presented for purposes of illustration and description. It is not intended to be exhaustive or to limit the invention to the precise form(s) disclosed, and modifications, and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined only by the following claims, as amended, and their equivalents.

DESCRIPTION OF REFERENCED NUMERALS

10 Target conductive object or pipeline
11 Longitudinal axis of pipeline 10
12 Bed of waterbody
14 Surface of waterbody
20 First watercraft
30 Second watercraft
Δ Distance between sensor 150 and either first watercraft 20 or conductive cable 111
50 Survey path
100 Large loop induction system
110 Signal generator or transmitter
111 Conductive cable or loop
112 Induction leg
113 Connection between induction leg 112 and return leg 114
γ Distance between partially parallel portions of induction leg 112 and return leg 114
114 Return leg
115 Float with positive buoyancy
116 Anchor
120 Primary signal
122 Induction area (primary magnetic field)
140 Induced signal
142 Detectible secondary magnetic field
150 Magnetic field sensor
400 Modified coil induction system
410 Waterproof coil
422 Induction area (primary magnetic field)
440 Induced signal propagation
442 Secondary magnetic field

What is claimed is:

1. A method of detecting and mapping the location of a buried underwater pipeline comprising a conductive material, the method comprising:
   a. deploying from a first water vehicle a conductive cable at least 3 meters in length comprising an induction leg and a return leg;
   b. positioning at least a portion of the induction leg proximate to the buried underwater pipeline, wherein the portion of the induction leg and the pipeline are separated by a first distance;
   c. positioning at least a portion of the return leg at least about twice the first distance from the induction leg;
   d. sending a signal of alternating current through the conductive cable, the signal having a frequency and the signal inducing a magnetic field in the pipeline having a frequency that is about the same as the frequency of the signal; and
   e. mapping the location of the pipeline by detecting the magnetic field of the pipeline.

2. The method of claim 1, detecting the magnetic field from the pipeline using a magnetic field sensor attached to a second water vehicle at least 30 meters from the first water vehicle.

3. The method of claim 1, further comprising sending a signal through the conductive cable comprising two one or more windings.

4. The method of claim 1, further comprising at least one water vehicle moving in a serpentine path above the pipeline.

5. The method of claim 1, further comprising at least one water vehicle moving in a path that is substantially parallel to the pipeline.

6. The method of claim 1, further comprising: the first water vehicle following a serpentine path; and a second water vehicle following a substantially linear path.

7. The method of claim 1, wherein the return leg has positive buoyancy.

8. The method of claim 1, wherein the induction leg has neutral or negative buoyancy.

9. The method of claim 1, wherein the conductive cable is attached to a first water vehicle and a magnetic field sensor is attached to a second water vehicle.

10. The method of claim 1, wherein a signal generator generates the signal and wherein the signal generator is not directly connected to the pipeline.

11. The method of claim 1, wherein the induction leg has a gauge that is different than a gauge of the return leg.

12. The method of claim 1, wherein at least a portion of the induction leg is positioned a distance of less than 4 meters from the pipeline.

13. The method of claim 1, wherein the signal is about 4 amperes.

14. The method of claim 1, wherein the conductive cable forms a loop; and positioning at least a portion of the return leg such that the loop forms an approximately vertical plane with respect to a waterbody bed below the loop.

* * * * *